US007483070B2

(12) United States Patent
Ogino

(10) Patent No.: US 7,483,070 B2
(45) Date of Patent: Jan. 27, 2009

(54) APPARATUS FOR INPUTTING IMAGE AND METHOD OF INPUTTING THE SAME

(75) Inventor: Hiroyuki Ogino, 1-4, Fudomae-cho 6-chome, Imadegawa-agaru, Teramachi, Kamigyo-ku, Kyoto City (JP)

(73) Assignee: Hiroyuki Ogino, Kyoto (JP)

( * ) Notice: Subject to any disclaimer, the term of this patent is extended or adjusted under 35 U.S.C. 154(b) by 1062 days.

(21) Appl. No.: 10/387,514

(22) Filed: Mar. 14, 2003

(65) Prior Publication Data

US 2003/0197791 A1    Oct. 23, 2003

(30) Foreign Application Priority Data

Mar. 28, 2002  (JP) ............................. 2002-091061
Feb. 5, 2003    (JP) ............................. 2003-028460

(51) Int. Cl.
*H04N 5/225* (2006.01)
(52) U.S. Cl. .................................................. 348/340
(58) Field of Classification Search ................. 348/344, 348/343, 340; 438/65; 257/431
See application file for complete search history.

(56) References Cited

U.S. PATENT DOCUMENTS

| 4,323,925 | A |   | 4/1982  | Abell et al. |        |
|-----------|---|---|---------|--------------|--------|
| 5,134,680 | A |   | 7/1992  | Schempp      |        |
| 5,446,529 | A | * | 8/1995  | Stettner et al. | 356/4.01 |
| 5,471,323 | A | * | 11/1995 | Suetsugi et al. | 358/511 |
| 5,572,034 | A | * | 11/1996 | Karellas     | 250/368 |
| 5,907,434 | A | * | 5/1999  | Sekine et al. | 359/462 |
| 6,137,535 | A | * | 10/2000 | Meyers       | 348/340 |
| 7,041,527 | B2 | * | 5/2006 | Wu           | 438/65 |

2002/0096753 A1 * 7/2002 Tu et al. ...................... 257/680

FOREIGN PATENT DOCUMENTS

| JP | A-04-090284 | 3/1992  |
|----|-------------|---------|
| JP | A-04-286480 | 10/1992 |

(Continued)

OTHER PUBLICATIONS

"The Photometric Camera and the CCDs"; http://www.astro.Princeton.edu/PBOOK/camera/camera.htm.

(Continued)

*Primary Examiner*—Justin P Misleh
(74) *Attorney, Agent, or Firm*—Oliff & Berridge, PLC

(57) ABSTRACT

An apparatus for inputting an image, includes a principal optical system on which a light beam corresponding to a single image is incident; light beam separating means for separating the light beam which passed through the principal optical system into a plurality of light beams; optical receiving and divided image group forming means for receiving the plurality of light beams, respectively, and forming divided image groups, each of said divided image group corresponding to the received light beams; and an image generating means for generating said single image by combining said divided image groups with one another. The single image is composed of the divided images. The number of the divided images is not less than that of the plurality of light beams. Each of the divided image groups has one or a plurality of divided images not adjacent to one another. The optical receiving and divided image forming means have imaging devices corresponding to the divided images, respectively.

3 Claims, 8 Drawing Sheets

FOREIGN PATENT DOCUMENTS

| | | |
|---|---|---|
| JP | A-05-130521 | 5/1993 |
| JP | A-06-233198 | 8/1994 |

OTHER PUBLICATIONS

"Wide Field and Planetary Camera 2 Instrument Handbook for Cycle 12" Version 7.0; Space Telescope Science Institute; Oct. 2002.

Hiroyuki Ogino et al.; "Development of Super High Definition Multi-Image Microscope System"; ITE Technical Report; vol. 20, No. 59, pp. 7-12; Nov. 1996.

Frank Harary; "Graph Therory"; Addison-Wesley Publishing Company; pp. 131-135; 1969.

Kenneth Apple et al.; "The Solution of the Four-Color-Map Problem" Scientific American; vol. 237 No. 4; pp. 108-121; Oct. 1977.

* cited by examiner

Enlarged view internal terminal

APPARATUS FOR INPUTTING IMAGE AND METHOD OF INPUTTING THE SAME

BACKGROUND OF THE INVENTION

1. Field of the Invention

The present invention relates to an apparatus for inputting the image and the method of inputting the same utilized in the field of the image processing in general.

2. Prior Art

Recently, in the field of the image processing, technologies relating to an imaging device make a rapid progress. As the background of such a rapid progress, there is a disadvantage that the apparatus for inputting the image with the imaging device does not necessarily satisfy the demand of the imaging at a high speed, a sufficient high sensitivity and a high resolution. In general, the limit of the input speed, the sensitivity and the resolution of the apparatus corresponds to the limit which an image provided by the current broadcasting or communication standard can be easily achieved technologically or economically.

Until now, inputting the image is input to the imaging device at a high sensitivity and a high resolution by the increase in the number of pixels and/or by the magnification of a photodetecting section. In this case, however, there are disadvantages (a) to (c) as described below.

(a) The increase in the number of pixels and/or the magnification of the photodetecting section bring the increase in the area of the imaging device, and thus reduce the operating speed of the apparatus.
(b) The increase in the number of pixels and/or the magnification of a photodetecting section make an integrated circuit large-scale, and it is known that faults and/or defects in the integrated circuit exponentially increase with the large-scale of the integrated circuit. As a result, there are technological and economical difficulties in making the remarkable large-scale circuit in order to form a single imaging device.
(c) The complexity in the design of the integrated circuit also exponentially increases with the large-scale integrated circuit.

Therefore, at the present technologies, it is very difficult to input the image to be an object into an imaging device at a sufficient high resolution and a sufficient high quality by means of a single imaging device, and thus it is necessary to establish the image input technology without a technological or economical limit.

On the other hand, in order to fulfill the requirement of the image input at a high speed, a high sensitivity and a high resolution, a method of dividing an optical system using a mosaic CCD array or a quadrangular-pyramid mirror has been proposed so that the requirement can be achieved by combining the optical system and a plurality of imaging device with one another, though it is almost impossible to achieve the requirement with a single imaging device (e.g. refer to non-patent document 1).

The method using the mosaic CCD array is used mainly in the field of the astronomy according to proposal of the University of Tokyo. In this case, the CCDs are arranged at the intervals to which these CCDs can be attached, and when the area can be imaged at one time, all of the area is imaged by moving the CCDs. In the method using the mosaic CCD array, however, because of the mechanical movement of the CCDs, it is difficult to perform a precise joint of the joint face of CCDs to each other and the input of the dynamic image (the moving picture).

The method using a quadrangular-pyramid mirror is utilized in the Hubble Space Telescope in the field of the astronomy and is utilized by Nippon Telegraph and Telephone Corporation in the field of the printing (e.g. refer to non-patent document 2). However, because it is diffcult to make an angle between sides of the quadrangular-pyramid mirror with a high accuracy, it is also difficult to divide one light beam into a plurality of the light beams, particularly, when the first-order image formation does not exist, an object on a focal point can be formed as an image, but an object at another position than the focal point is formed as multiple divided images or as a partially lost image. In other words, the method using a quadrangular-pyramid mirror has a characteristic of dividing the image into four parts of the image and is suitable for inputting a two-dimensional static image to be divided into four parts of the image.

The abstract of the above-mentioned methods are as follows:

(i) The method using a mosaic CCD is not suitable for inputting the dynamic image because of accompanying the mechanical movement of the CCDs.
(ii) The method using a quadrangular-pyramid mirror has a characteristic of dividing the image into four parts of the image and is suitable for inputting a two-dimensional static image to be divided in four parts of the image when the first-order image formation does not exist.

In both cases (i) and (ii), it is difficult to divide the optical image into a plurality of the optical images with a high accuracy. Also, in principle, the imaging device is constituted so as to pick up a single light beam from the optical system by means of the single imaging device, and thus even if these conventional optical system and a plurality of imaging device are combined with one another, it is impossible to make a good combination of the optical system with the plurality of imaging devices.

Also, a method of dividing an optical image with a high accuracy by means of an optical fiber array (see patent documents 1 and 2, for example) and a method of dividing an optical image by means of a beam splitter (see non-patent document 3, for example) have been also proposed.

Further, in the field of graph theory, there is the assumption relating to the possibility of distinguishable coloring a graph in four colors, namely, the problem that "any map drawn on a plane or spherical surface can be distinguished with four colors so that adjacent countries to each other are different from each other in color, such a problem being famous as a problem of separating countries by color in a world map (non-patent document 4 for example), and there is also a fact that any countries can be actually distinguished with four colors (see non-patent document 5 for example).

Patent document 1: U.S. Pat. No. 4,323,925 Specification (FIG. 1)

Patent document 2: U.S. Pat. No. 5,134,680 (FIG. 5, FIG. 6)

Non-patent document 1: Jill Knapp and five others, "The Sloan Digital Sky Survey Project Book" disclosed online on Aug. 11, 1999 in the Astrophysical Research Construction, retrieved on Nov. 29, 2002 on the Internet at www.astro.princeton.edu/PBOOK/welcome.htm (FIG. 8.2, FIG. 8.4)

Non-patent document 2: "Wide Field and Planetary Camera 2 Instrument Handbook for Cycle 12", Version 7.0, SPACE TELESCOPE SCIENCE INSTITUTE, October, 2002 (FIG. 2.1, FIG. 2.2)

Non-patent document 3: Hiroyuki Ogino et al., "Development of a High-Resolution Multiple Image Microscope Apparatus", the Institute of Television Engineers of Japan, Technical Report Vol. 20, No.59, pp.7-12, Nov. 15, 1996 (FIG. 2)

Non-patent document 4: Frank Haraey, "GRAPH THEORY", ADDISON-WESLEY, pp.131-135, (THE FOUR COLOR CONJECTURE), 1969

Non-patent document 5: Kenneth Apple et al., "The Solution of the Four-Color-Map Problem", Scientific American, vol.237, No.4, pp.108-121, October, 1977

As already stated, it is difficult to realize an imaging apparatus satisfying the condition of inputting the image at a high sensitivity, a high resolution and a high speed by means of a single imaging device, and this can be explained on the basis of the theory of algorithm in theory. In order to realize an imaging apparatus satisfying such a condition without technological and economical difficulties relating to making a large-scale integrated circuit, it is necessary to put a technology of well combination of the optical system with a plurality of imaging devices to practical use. Such a requirement is particularly remarkable in the field of a remote medical treatment (e.g. the telemicroscopy, especially the telepathology) necessary to process an image with a high accuracy in real time, and at the present stage, it is very difficult to constitute an image input apparatus at a high speed, a high sensitivity and a high resolution enough to be applied to the field of the remote medical treatment.

DISCLOSURE OF THE INVENTION

An object of the present invention is to provide the apparatus for inputting the image and the method of the same capable of inputting the image at a high speed, high sensitivity and a high resolution without technological and economical difficulties relating to making a large-scale integrated circuit.

Another object of the present invention is to provide the apparatus and the method capable of dividing an optical image with a high accuracy.

In one aspect of the present invention, there is provided an apparatus for inputting an image, comprising:

a principal optical system on which a light beam corresponding to a single image is incident;

light beam separating means for separating the light beam which passed through the principal optical system into a plurality of light beams;

optical receiving and divided image group forming means for receiving a plurality of light beams, respectively, and forming divided image groups, each of the divided image group corresponding to the received light beam; and an image generating means for generating a single image by combining the divided image groups with one another;

wherein the single image is composed of the divided images, the number of the divided images is not less than that of a plurality of light beams, each of the divided image groups has one or a plurality of divided images not adjacent to one another, and the optical receiving and divided image forming means have imaging devices corresponding to the divided images, respectively.

According to the present invention, a light beam which passed through the principal optical system into a plurality of light beams and then a plurality of light beams are received and divided image groups corresponding to the received light beams are formed. After then, the single image is formed as a multiple images by combining the divided image groups with one another.

In this case, the single image composed of the light beam incident on the principal optical system is formed from the number of the divided images not less than the number a plurality of light beams, and a group of the divided image has one divided image or a plurality of divided images not adjacent to one another. Further, the optical receiving and divided image forming means has imaging devices corresponding to the divided images, respectively.

Therefore, because one imaging device is used for each of divided images not adjacent to one another, it is possible to use a plurality of imaging devices for each of a plurality of divided light beams. As a result, the substantial same effect as the increase in the number of pixels and/or the magnification of an optical receiving section can be obtained without abovementioned problems (a) to (c), the optical system and a plurality of imaging devices are well combined with each other, and thus it is possible to input the image at a high speed, a high sensitivity and a high resolution without technological and economical difficulties relating to making a large-scale integrated circuit. Thereby, it is possible to constitute the apparatus at a high speed, a high sensitivity and a high resolution enough to be applied to the field of the remote medical treatment. Herein, the term "single image" means an image formed after passing through the principal optical system.

The group of the divided images is obtained by applying the possibility of the graph color separation problem in the graph theory. In other words, images adjacent to one another are separated with minimum colors, the relation of adjacency among them is kept, divided and inversed images with the same color in a group out of these distinguishably separated images in color are separated and picked up with a optical and electronic adjustment, and thus the images with any resolution at least two groups of at least one imaging devices are fully picked up. And then the group of the divided images are arranged on the basis of information of the relation of adjacency among the divided images.

In case of establishing a single image composed of the number of the divided images not less than the number of a plurality of light beams, it is considered to pick up the image with the requirement of a high sensitivity, a high resolution and a high speed, and the divided images capable of achieving technologically and/or economically are established as a unit.

In order to divide an optical image with a high accuracy, such a division being difficult until now, preferably, the light beam separating means have at least one of a beam splitter, a mirror (e.g. a mosaic-shaped mirror) and an optical fiber array. A fact that an optical image can be divided by means of the beam splitter with a high accuracy has been demonstrated in the above-described non-patent document 3.

Each of the imaging device comprises an integrated circuit with a terminal to be connected to outside, and a separating/connecting section to be connected to the terminal and to be separated electrically separable from outside. Thereby, the integrated circuit with faults and/or defects can be replaced by another one without fault and/or defects in the unit of divided image, and thus it is possible to reduce the technological and economical difficulties relating to large-scaling of the integrated circuit remarkably.

The separating/connecting section electrically separates the integrated circuit from another one by the change of the applied signal and/or by the mechanical cut of these integrated circuit. The separating/connecting section is made from a material to be cut by the current flowing though the separating/connecting section, for example.

In another aspect of the present invention, there is provided a method of inputting an ie comprising steps of:

making a light beam corresponding to a single image being incident on a principal optical system;

separating the light beam which passed through the principal optical system into a plurality of light beams;

receiving the plurality of light beams, respectively, and forming divided image groups, each of the divided image groups corresponding to the received light beams in accordance with each of imaging devices; and generating the single image by combining the divided image groups with one another;

wherein the single image is composed of the divided images, and the number of the divided images is not less than that of the plurality of light beams.

According to the present invention, it is possible to input the image at a high speed, a high sensitivity and a high resolution without the technological and economical difficulties relating to large-scaling the integrated circuit.

By separating the light beam into a plurality of light beams by means of at least one of a beam splitter, a minor (e.g. a mosaic-shaped mirror) and an optical fiber array, it is possible to divide the optical image with a high accuracy, such a division being difficult until now.

BRIEF DESCRIPTION OF THE DRAWINGS

FIG. 8 shows patterns of groups of the divided image.

DETAILED DESCRIPTION OF THE PREFERRED EMBODIMENTS

Embodiments of the apparatus and the method according to the present invention are described in detail with reference to the drawings, and the corresponding reference numbers represent the corresponding components respectively.

Figure 1:
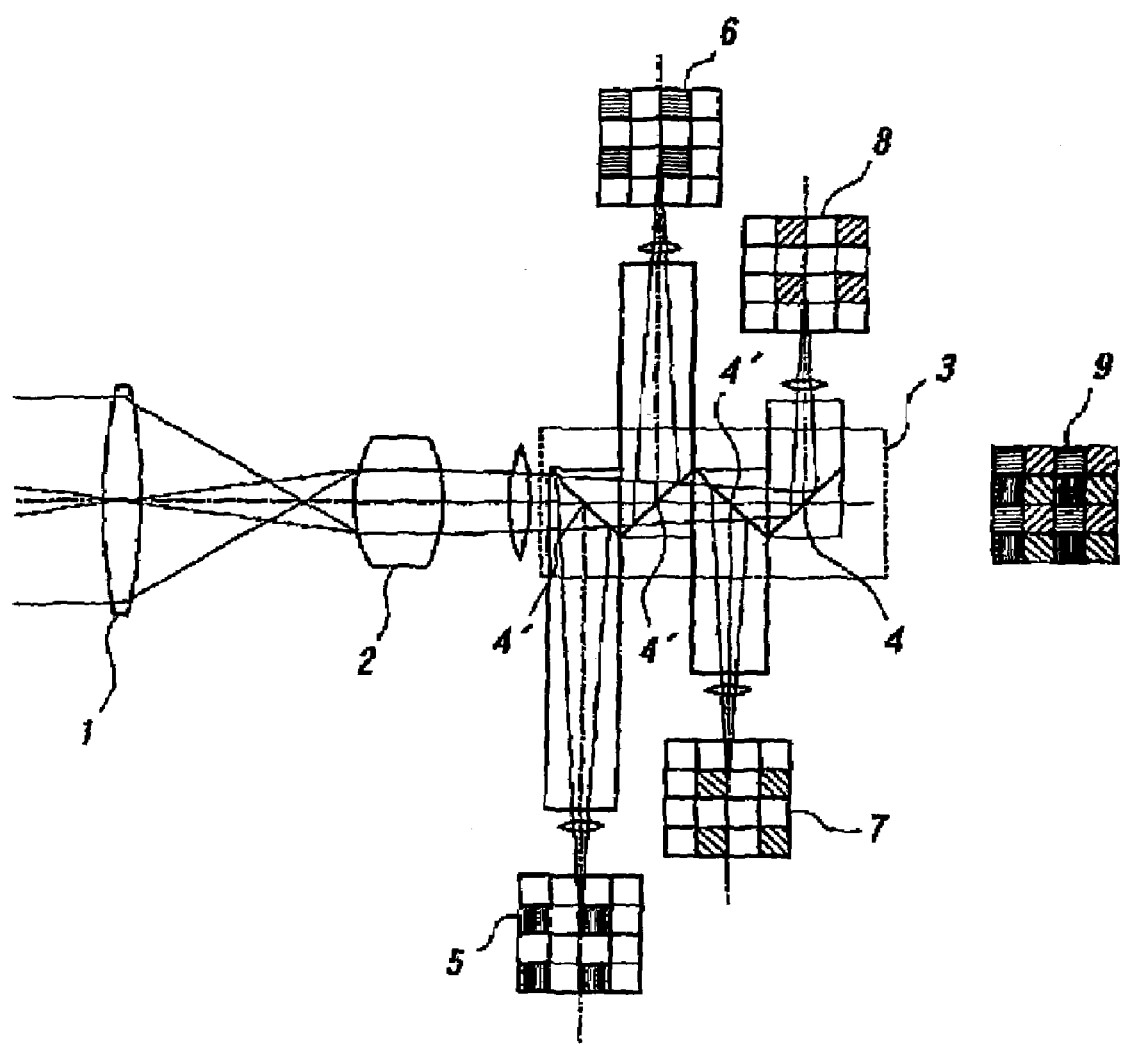
FIG. 1 shows one embodiment of the apparatus according to the present invention.

FIG. 1 shows one embodiment of the apparatus according to the present invention. In the embodiment, a light beam corresponding to a single image is incident on a principal optical system 1, and an optical image optically collected and formed by the principal optical system 1 is led through a relay optical system 2 to a multiple optical system 3 as the light beam separating means.

According to the embodiment, as the multiple optical system 3, a beam splitter with a multiple separation prism mirrors 4, 4' of a parallel beam optical system like a telecentric system, and thus it is possible to reduce the attenuation in the quantity of the light comparatively.

The multiple optical system 3 separates the incident light beam into four light beams and these four light beams are incident on section 5 to 8 for picking up the multiple image separately as the optical receiving and divided image group forming means. Each of the sections 5 to 8 forms a divided image group with divided images, each divided image being hatched in FIG. 1. Each of the light beam to be incident on the sections 5 to 8 attenuates in the quantity of light to not more than ¾ of the light compared to that to be incident on the principal optical system 1, but such an attenuation has little influence on operation of the whole system because the attenuation is compensated by a peripheral functional section as described hereinafter.

In the embodiment, a single image is composed of 16 divided images, each divided images being square, in other words, having the same shape, and each of divided image groups has four divided images not adjacent to one another. Then the groups are combined with one another by a data outputting section as the image generating means as described later to produce a single image 9 as a multiple image. In case of picking up the image of a particular wavelength or a color image, it is enough to provide a corresponding number of the apparatuses as shown in FIG. 1.

Figure 2:
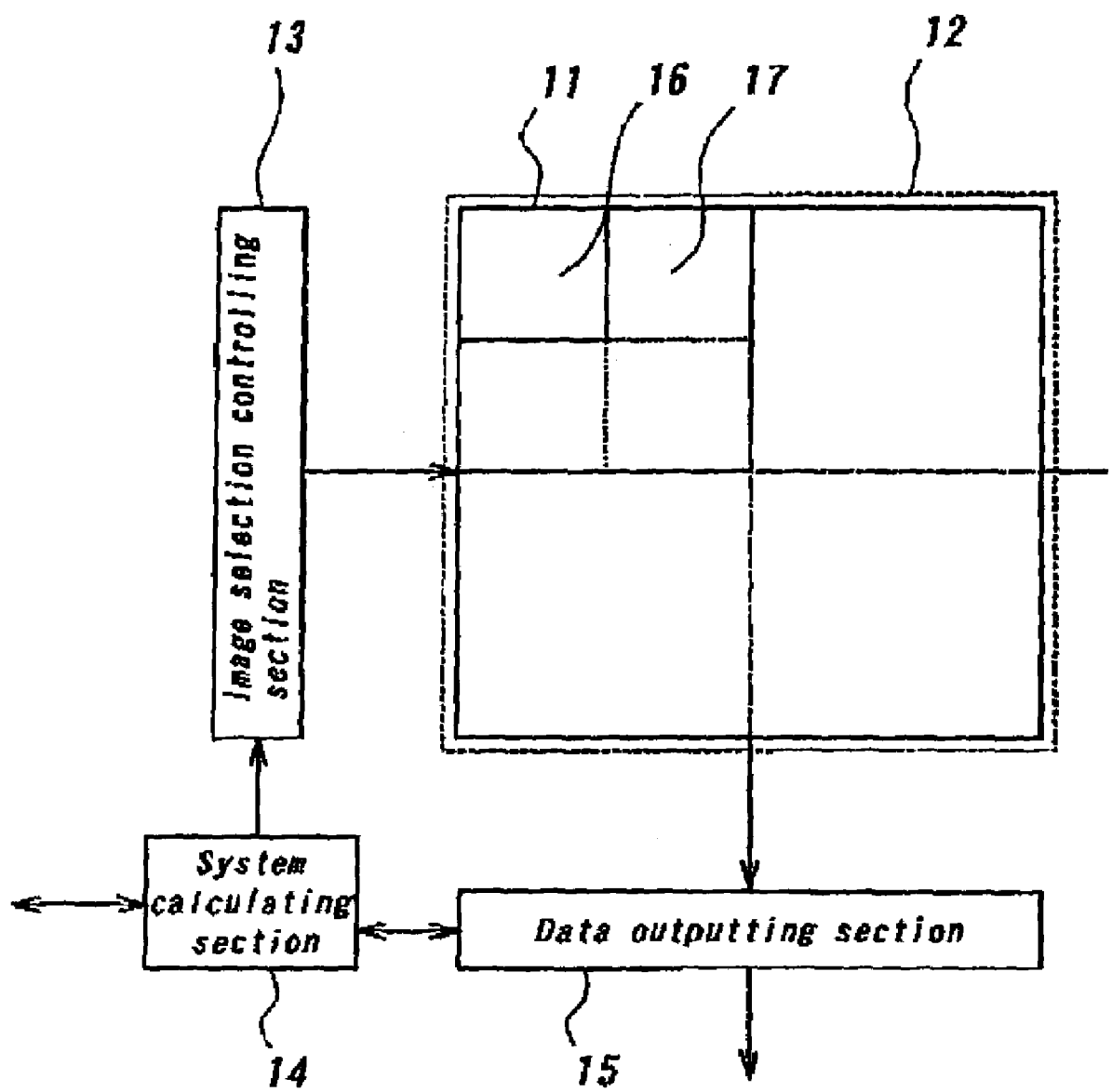
FIG. 2 shows a section for picking up the multiple image separately in FIG. 1 in detail.

FIG. 2 shows the section 6 in FIG. 1 in detail. The section comprises an imaging device array 12 with four imaging devices 11 arranged in the shape of a matrix of two rows and two columns, an image selection controlling section 13, a system calculating section 14 and a data outputting section 15. The imaging device 11 comprises a unit imaging section 16 and a peripheral functional section 17.

The section 16 mainly composed of an optical receiving section converts the light into an electric signal by performing exposure the section 16 wholly or partially for a certain time, and reads divided images successively or individually. And the section 16 is arranged so as to pick up the divided image group to be an object.

The imaging device array 12 can pick up an image of a particular wavelength or a color image by providing the imaging devices with filters, respectively or providing the imaging devices with filters as one set of pixel unit of three primary colors (RGB).

The section 17 has at least one functions of driving a optical receiving section, temporarily storing the charges obtained by driving the optical receiving section, amplifying the obtained image signal, digitizing the image signal, outputting an analog signal or a digital signal, storing the digital image data or a program, as well as control, process, input/output, and communication of these operations.

The section 13 controls the imaging device array 12 to select and read one or plural imaging devices. The section 15 outputs a read image signal directly or after digitizing the image signal. The section 14 performs all control, process, input/output and communication.

In processing the image, a signal calculating section (as described after) contained in the section 17 performs the compression or format conversion of the image data in parallel, in series or individually solely or together with the section 14. In this case, depending on the form of compression, the image is picked up in accordance with the unit of the compression, the data is transferred in the signal calculating section or the section 14, and thus the process is performed so as not to occur the inconsistency relating to a unit of the image and a unit of the compression.

Figure 3:
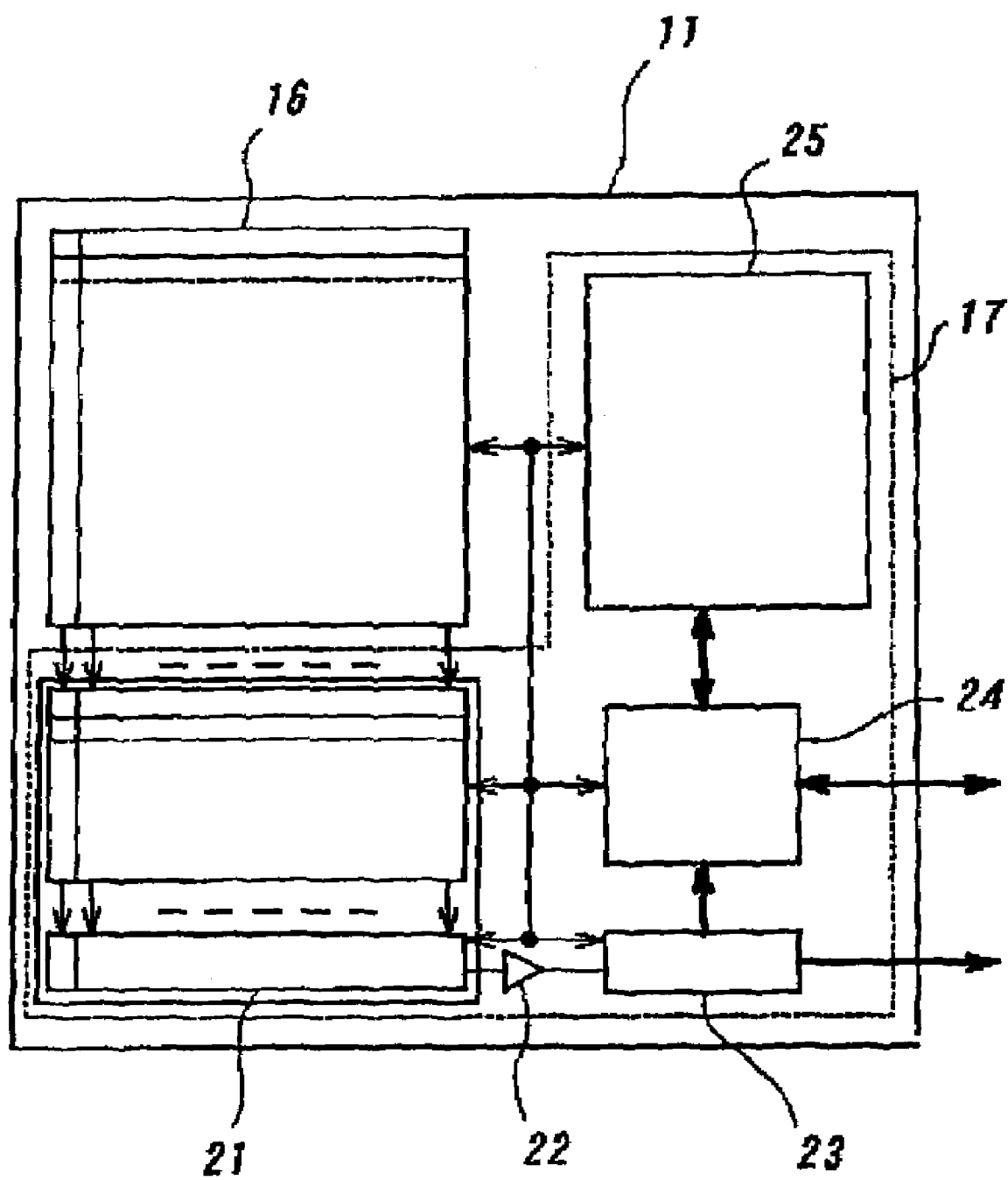
FIG. 3 shows an imaging device in FIG. 2 in detail.

FIG. 3 shows the imaging device 11 in FIG. 2 in detail. In FIG. 3, the section 17 comprises a storing section 21, an amplifying section 22, a digitizing section 23, a signal calculating section 24 and a memorizing section 25, and operations relating to these sections are as described above.

Because the picked up image is linearly changed in accordance with the intensity of the light and the dynamic range of the image signal increases, the image signal of the dynamic range is compressed by means of the white clipping, the white balancing, the gamma correction and so on and the image signal is transmitted while considering the analog amplification, the transmission system and so on until now.

On the other hand, according to the embodiment, by converting a signal output from the section 16 into the digital signal by means of the section 17 immediately, the image data is accurately transmitted without loss while keeping a high dynamic range and thus a high resolution image correctly formed into a single image as a whole is input.

Figure 4:
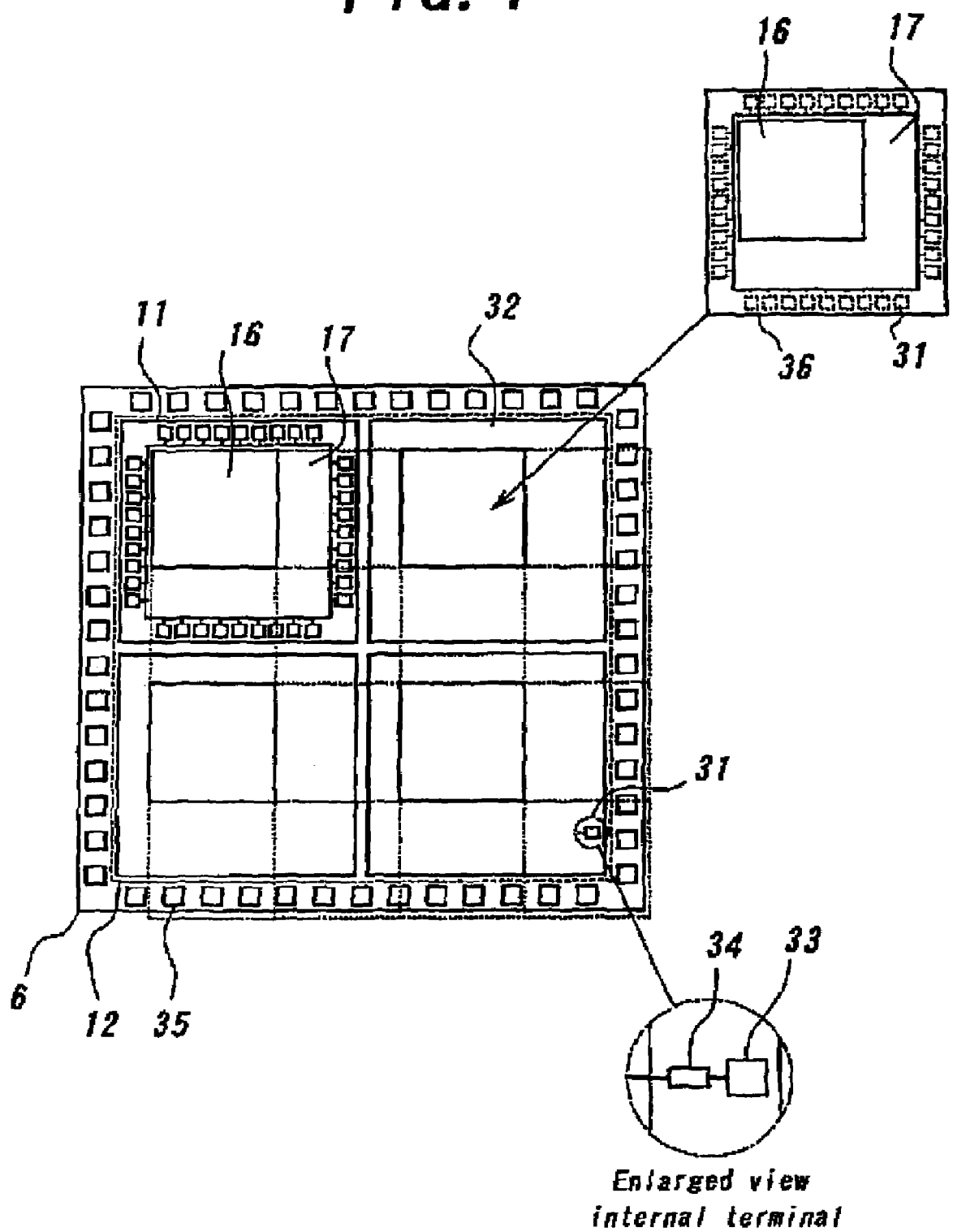
FIG. 4 shows another section for picking up the multiple image separately in FIG. 1 in detail.

FIG. 4 shows another section 11 in FIG. 1 in detail. In the embodiment, the imaging device 11 comprises an integrated circuit 32 with the section 16, the section 17 and a plurality of internal terminals 31, and each of internal terminals 31 has a terminal 33 to be connected to outside and a separating/connecting section 34 to be connected to the terminal 33 and electrically separable from outside.

When faults and/or defects are detected through the terminal 33 and/or an outside terminal 35, the section 34 is cut electrically by a fuse or mechanically by laser machining, and then an integrated circuit 36 for replacement is connected to a substrate by means of welding, bonding or soldering. The integrated circuit 36 has the section 16, the section 17 and a plurality of the internal terminals 31.

Thereby, because the integrated circuit 32 with faults and/or defects can be replaced at a unit of the divided image, it is not necessary to be large-scaled the integrated circuit 32, and thus it is possible to reduce the technological and economical difficulties remarkably.

When the integrated circuit 36 is mounted on the section 6, the integrated circuit 36 is held so that all faces of the optical receiving section are directed in a certain direction by connecting terminals 33 to the substrate by means of soldering, welding, bonding and so on. Also, the integrated circuit 36 has such thickness that it has no influence on image formation, and the influence of change in thickness as a whole caused by mounting the integrated circuit 36 can be reduced remarkably by changing the focal point of a light beam in each of optical systems located between the multiple optical system 3 (FIG. 1) and the sections 5 to 8 and increasing the depth of field or leading the light beam from the multiple optical system 3 directly to each of the sections 5 to 8.

While the present invention has been described above with reference to certain preferred embodiments, it should be noted that they were present by way of examples only and various changes and/or modifications may be made without departing from the scope of the invention. For example, in the above-mentioned embodiment, the relay optical system is arranged between the principal optical system 1 and the multiple optical system 3, however, the relay optical system 2 can be omitted or another relay optical system of an optional structure (e.g. a relay optical system 2' in FIG. 5) can also be used.

Figure 5:
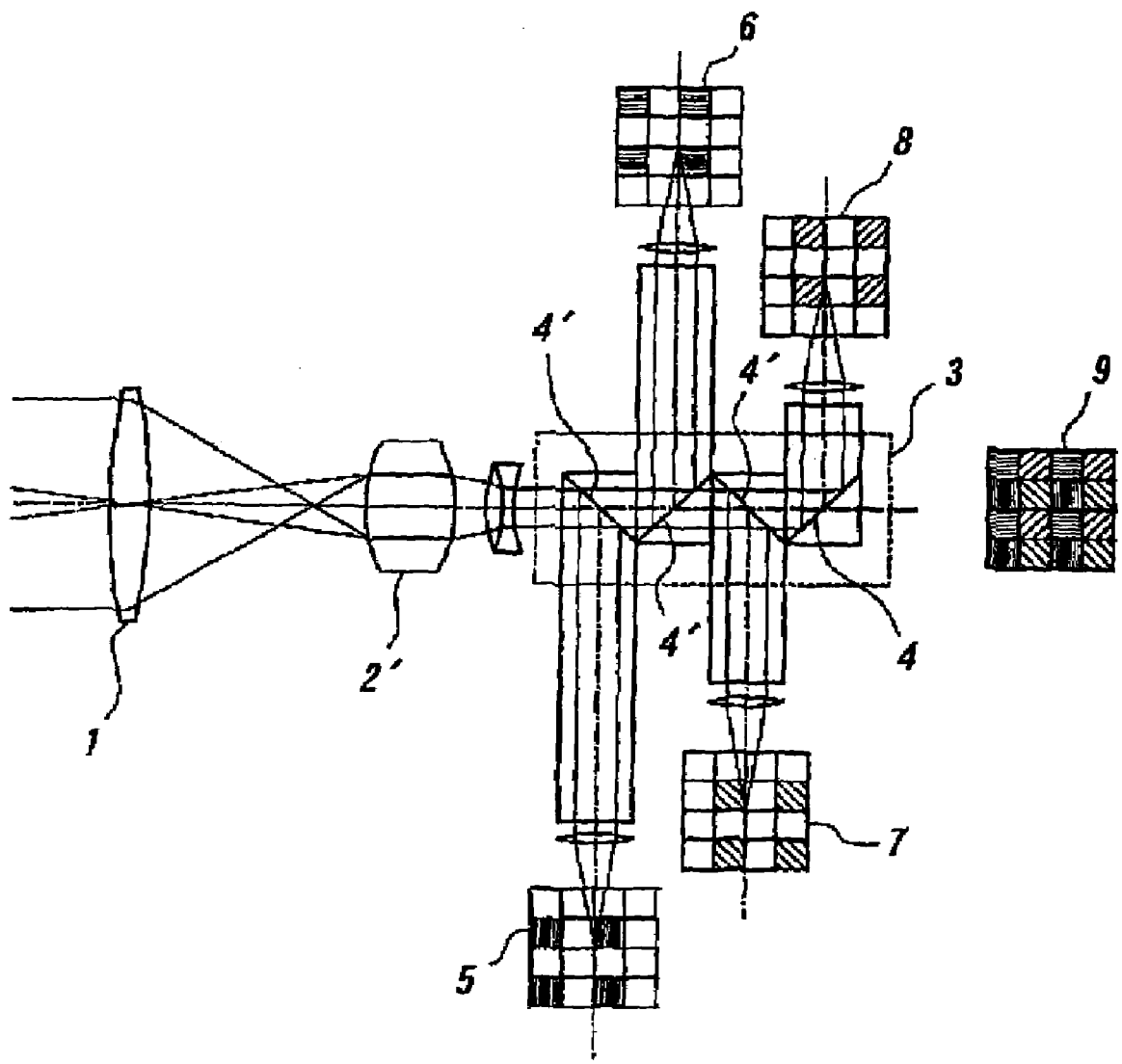
FIG. 5 shows another embodiment of the apparatus according to the present invention.
Figure 6A:
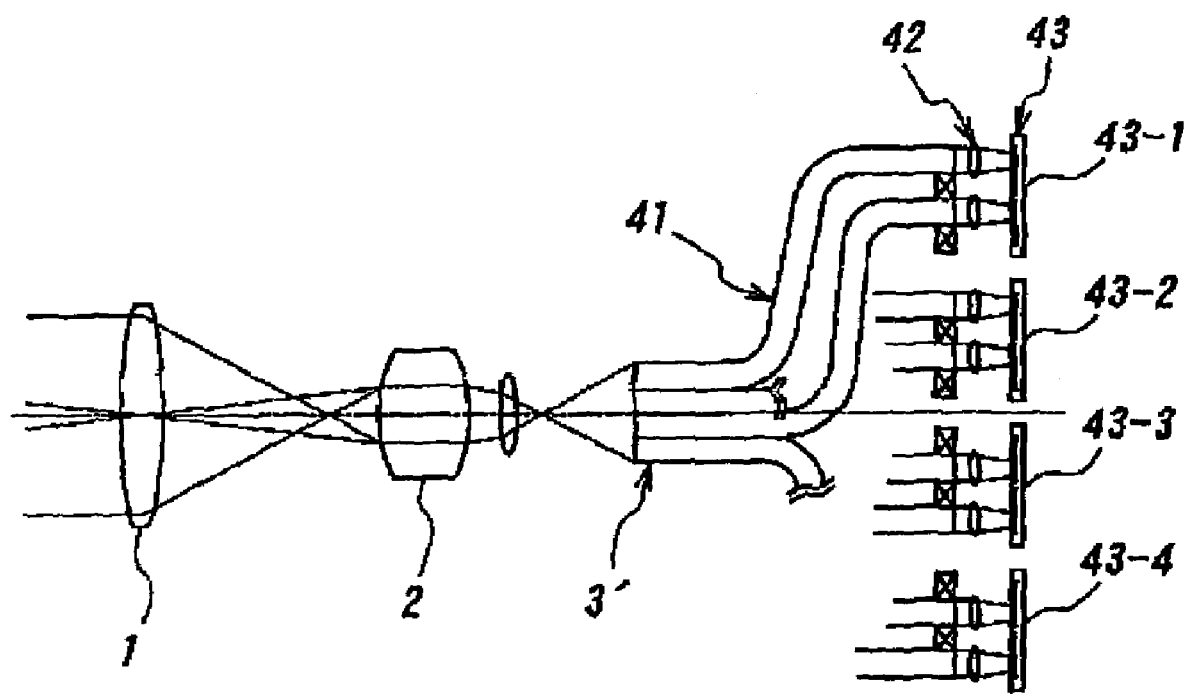
FIGS. 6A-6B shows another embodiment of the apparatus according to the present invention.
Figure 6B:
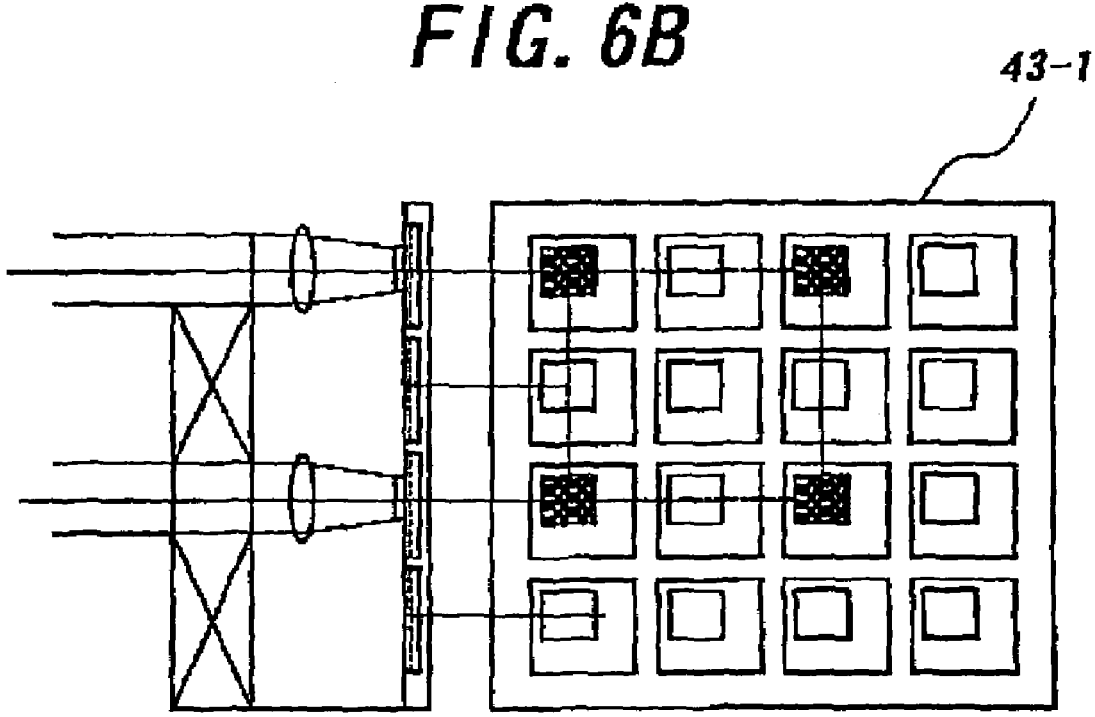

In case of separating the light beams by means of the multiple optical system 3, it is also possible to adopt the optical fiber array or an image transmitting block with a plurality of optical waveguides formed in the shape of a lattice. In this case, as shown in FIG. 6A, the apparatus comprises the principal optical system 1, the relay optical system 2, a multiple optical system 3' with an optical fiber array 41, a multi-lens array 42 and an array 43 of a section 43-1 to 43-3 for picking up the multiple image separately. In this case, the light beam is incident on each of imaging devices located at the first row and first color at the first row and third column, at the third row and first column, as well as at the third row and third column of the section 43-1 through the corresponding optical fiber and lens (see FIG. 6B). The light beam is incident on the sections 43-2 to 43-4 through the corresponding optical fibers and lenses in the same way. In FIG. 5, a light beam can be separated by means of a parallel beam optical system and a multiple separation prism mirror 4 (a mosaic-shaped mirror capable of performing the total reflection) as the multiple optical system.

In the above-mentioned embodiment, the case of separating the incident light beam into four light beams has been explained, however, it is also possible to apply to the case of separating the incident light beam into another number of light beams than four light beams in the present invention.

Figure 7:
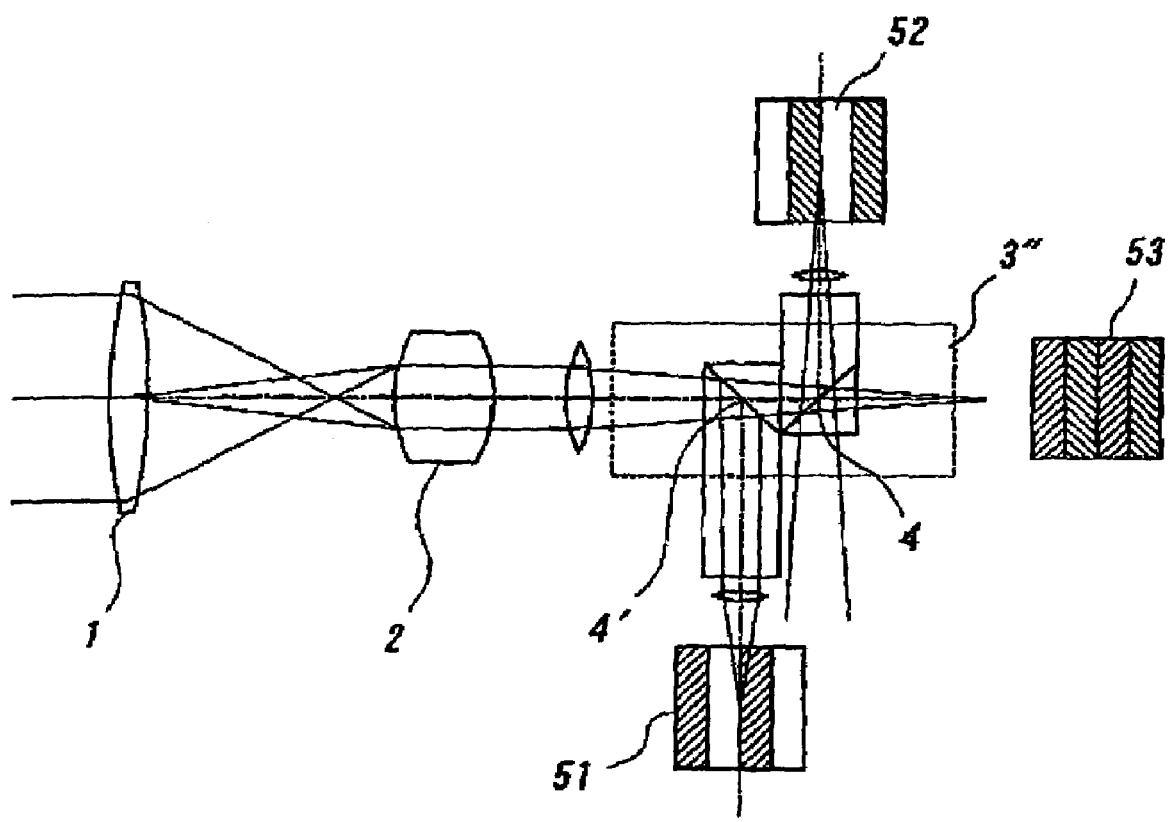
FIG. 7 shows another embodiment of the apparatus according to the present invention.

Explaining the case of separating the light beam into two light beams, in FIG. 7, a multiple optical system 3" separates the incident light beam into two light beams, and each of these two light beams is incident on sections 51 and 52 for picking up the multiple image separately. Each of the sections 51 and 52 forms a group of the divided images hatched in FIG. 7, and thereafter the groups are combined together by a circuit not shown in FIG. 7 to generate a single image 53 as a multiple image.

Further, although the case of composing a single image of 16 divided images and forming groups of the 4 divided images not adjacent to one another has been described, any structure can be applied to any groups of at least one divided image as long as the problem of the possibility of distinguishable coloring a graph in the theory of graph is applied. That is to say, it is enough to separate a single light beam into a plurality of light beams, form a single image from a number of the divided images not less than the number of the light beams divided by the multiple optical system, the divided images having the same shape or a plurality of shapes, and each of the group of the divided images have a single divided image or a plurality of divided images not adjacent to one another.

Figure 8A:
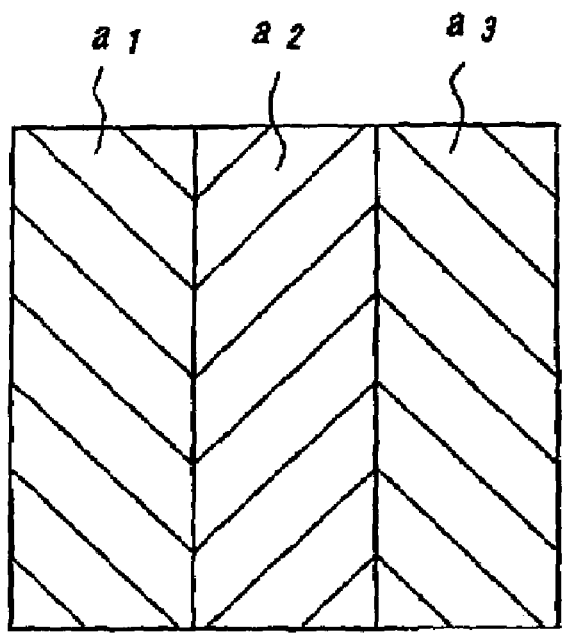
FIGS. 8A-B shows patterns of groups of the divided image.

Explaining the minimum number of the divided images which can be applied to the present invention, in case of separating the light beam into two light beams, as shown in FIG. 8A, it is enough to divide the image into at least three divided images a1, a2 and a3, and each of sections 51 and 52 for picking up the multiple image separately (FIG. 7) forms a group of divided images a1, a3 and a group of a divided image a2, respectively.

Figure 8B:
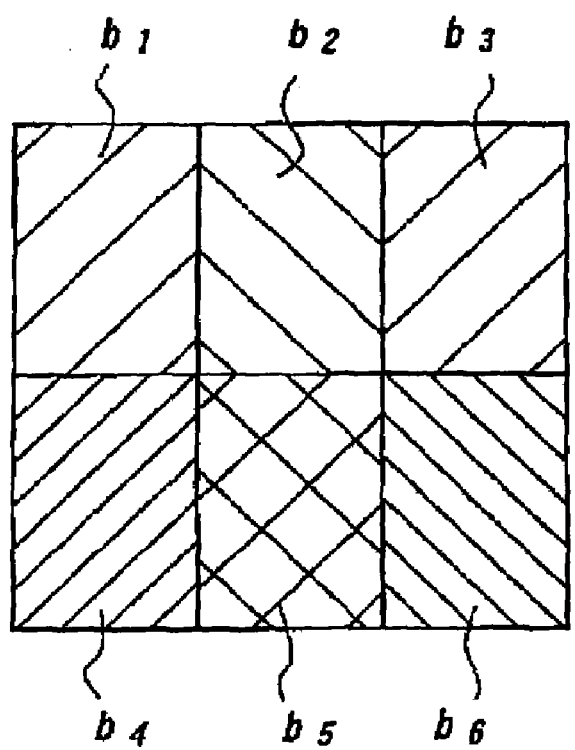

On the other hand, in case of separating the light beam into four light beams, as shown in FIG. 8B, it is enough to divide an image into at least six divided images b1 to b6 and each of the sections 5 to 8 forms a group of divided images b1 and b3, a group of a divided image b2, a group of divided images b4 and b6, and a group of a divided image b5.

And in case of separating the light beam into three light beams, it is also possible to divide a single image into four rectangular divided images c1 to c4 and one square divided image c5 by means of the principal optical system 1, the relay optical system 2 and the multiple optical system 3" shown in FIG. 7 (see FIG. 8C). In this case, each of three sections for picking up the multiple image separately have only to have two rectangular imaging devices corresponding to divided image c1 and c4, two rectangular imaging devices corresponding to divided image c2 and c3, and one square imaging device corresponding to one square divided image c5, as well as form a group of divided images c1 and c4, a group of divided images c2 and c3, and a group of a divided image c5.

The performance of the section for picking up the multiple image separately is determined by exposure and the time period taken for picking up charges in exposure. The time of imaging is constant regardless of the shape of the image, and the time for taking a remaining image is an important factor. In case that the divided image is square, the number of the rows of the imaging device is same as that of the column of the imaging device, a read operation is performed in one of the row and column directions. In case that the divided image is rectangular, by performing a read operation in the direction of either shorter one of row and column, it is possible to increase the degree of parallel operations and thereby perform a read operation in the same time as the time for reading the square divided image.

When the optical image is divided by means of a multiple optical system, each of divided light beams is led to the corresponding section for picking up the multiple image separately, and the optical image is formed while keeping a certain groups of at least one divided images, in order to reduce the influence caused by division of the image, it is also possible to use a light over-divide method of magnifying and dividing the image so that the defect in the image is smaller than the interval (width) between scanning lines, or use a light over-sampling method of dividing the optical image in the state of high resolution of the optical image in order to divide the image by means of an image transmitting block with optical fiber bundles or a plurality of optical waveguides formed into the shape of a lattice and lead the light beams to the sections for picking up the multiple image separately.

On the other hand, it is also possible to provide a margin by making larger the resolution or area of an imaging device than an optical image formed at a unit of the image and thus make the accuracy of a joint portion higher. It is also possible to use a optical receiving device with a micro-lens mounted on the optical receiving device or having a focal point at infinity and use an infinity optical system, a telecentric optical system excellent in dividing characteristic or the optical system excellent in vignetting and comparatively small in chromatic aberation in order to exactly and accurately divide and lead the light to such an optical receiving device.

The invention claimed is:

1. An apparatus for inputting an image, comprising:
   a principal optical system on which a light beam corresponding to a single image is incident;
   light beam separating means for separating the light beam which passed through said principal optical system into a plurality of light beams corresponding to divided image groups each having divided images not adjacent to one another;
   optical receiving and divided image group forming means for receiving said plurality of light beams, respectively, and forming the divided image groups, each of said divided image groups corresponding to one of the received light beams; and
   image generating means for generating said single image by combining said divided image groups with one another;
   wherein said single image is composed of divided images, the number of said divided images is not less than that of said plurality of light beams,
   each of said divided image groups is obtained by applying a possibility of a graph color separation problem in a graph theory,
   said optical receiving and divided image forming means has imaging devices corresponding to said divided images, respectively, and
   said light beam separating means has an optical fiber array.

2. The apparatus according to claim 1, wherein each of said imaging devices comprises an integrated circuit with a terminal to be connected to outside, and a separating/connecting section to be connected to said terminal and to be separated electrically from outside.

3. A method of inputting an image comprising steps of:
   making a light beam corresponding to a single image being incident on a principal optical system;
   separating the light beam which passed through said principal optical system into a plurality of light beams by means of an optical fiber array;
   receiving said plurality of light beams, respectively, and forming divided image groups, each of said divided image groups corresponding to one of the received light beams in accordance with each of imaging devices, the divided image groups each having divided images not adjacent to one another; and
   generating said single image by combining said divided image groups with one another;
   wherein said single image is composed of divided images,
   the number of said divided images is not less than that of said plurality of light beams, and
   each of said divided image group is obtained by applying a possibility of a graph color separation problem in a graph theory.

* * * * *